(12) United States Patent
Nassimi

(10) Patent No.: US 7,142,814 B2
(45) Date of Patent: Nov. 28, 2006

(54) AUTOMATIC BLUETOOTH INQUIRY MODE HEADSET

(76) Inventor: Shary Nassimi, 2002 NW. 215 Cir., Ridgefield, WA (US) 98642

(*) Notice: Subject to any disclaimer, the term of this patent is extended or adjusted under 35 U.S.C. 154(b) by 524 days.

(21) Appl. No.: 10/317,450

(22) Filed: Dec. 11, 2002

(65) Prior Publication Data

US 2004/0203357 A1   Oct. 14, 2004

(51) Int. Cl.
*H04B 7/00* (2006.01)
(52) U.S. Cl. .................. 455/41.2; 455/41.3; 455/572
(58) Field of Classification Search ............ 455/41.2, 455/41.3, 572, 574, 575.2, 343.1, 343.2, 455/343.3, 343.5
See application file for complete search history.

(56) References Cited

U.S. PATENT DOCUMENTS

| | | | |
|---|---|---|---|
| 6,421,426 B1* | 7/2002 | Lucey | 379/56.3 |
| 2001/0019956 A1* | 9/2001 | Tada | 455/434 |
| 2003/0063003 A1* | 4/2003 | Bero et al. | 340/573.1 |
| 2003/0125846 A1* | 7/2003 | Yu et al. | 701/1 |
| 2003/0149666 A1* | 8/2003 | Davies | 705/50 |
| 2004/0060059 A1* | 3/2004 | Cohen | 725/30 |

* cited by examiner

Primary Examiner—Edan Orgad
(74) Attorney, Agent, or Firm—George R. McGuire; Bond, Schoeneck & King, PLLC

(57) ABSTRACT

The present invention provides a Bluetooth enabled headset/master unit set which allows easy pairing of Bluetooth devices. The miniature headset of the present invention may be of a reduced size and weight due to the ease of pairing/authentication.

Pairing of the headsets and master units may be accomplished by a push button method: the master unit has a "pairing" button which when pushed, automatically causes the master unit to mate with nearby units, possibly at a lower power setting.

Pairing of the headsets and master units may be accomplished in an even simpler way, in which not even a button is necessary. In this embodiment of the invention, removal and replacement of the power supply of the unit (batteries in a wireless headset embodiment, batteries or a power switch in a master unit embodiment) is sufficient to cause the authentication/inquiry mode to begin operation, resulting in pairing with nearby Bluetooth enabled devices. In a sub-embodiment of this embodiment, the removal and replacement of the power supply must occur within a set time frame such as 45 seconds.

Device and method embodiments are taught.

6 Claims, 4 Drawing Sheets

AUTOMATIC BLUETOOTH INQUIRY MODE HEADSET

FIELD OF THE INVENTION

This invention relates generally to wireless headsets and more specifically to wireless headsets having BLUETOOTH communication capabilities.

BACKGROUND OF THE INVENTION

Modern wireless headsets provide greater convenience and safety to the users of such devices as office telephones, by allowing the user partially or completely hands free operation of the telephone. By the use of such devices, office workers may simultaneously speak to customers or business associates upon the telephone while making entries into a computer, using other office equipment and other diverse tasks. Such headsets normally comprise some sort of head band or ear clip to retain the headset in the proper position, a microphone located near the mouth, and such wireless equipment as is necessary to communicate with a base unit or master unit located at or on the office telephone, cellular telephone, or similar device.

Bluetooth (Trademark of Bluetooth SIG, Inc) is a rapidly evolving wireless communications standard for small devices having link and application layer definitions for communications protocols, bandwidths and so on. Bluetooth enabled devices use the 2.4 to 2.4835 GHz band in most nations, a loosely regulated band of the frequency spectrum allowing high bandwidth, short range communications using 625 microsecond time division packets. Within the overall band, frequency hopping among 79 frequencies at a full duplex 1600 hops per second provides the ability to operate in a network of similar Bluetooth enabled devices with multiple simultaneous connections established.

This ability to allow multiple simultaneous connections is particularly important in the Bluetooth enabled workplace. For example, it would be pointless to have multiple Bluetooth enabled devices attempting access to a Bluetooth enabled printer if only one at a time may actually connect with the printer. Similarly, a workplace using multiple Bluetooth enabled headsets would drown in a sea of babble if different frequencies between master units and headsets were not available for each headset user. On the other hand, the ability offered by Bluetooth to handle in one network more than one connection allows each headset user to communicate properly with their headset's master unit, or to use the headset for short range office communications with other Bluetooth enabled headsets, master units and other devices.

This ability requires several types of identification, called "access procedures" in the Bluetooth specification core documents. Two in particular are important in the context of the present invention. The first type of identification is the "page/page scan/response", used to establish communications between two Bluetooth enabled devices. In essence, the Bluetooth device initiating the contact will send out a packet identifying the device with which it desires contact and a communications channel will be opened up. The second type of identification is the "inquire scan/inquire response" in which a Bluetooth unit attempts to determine in fact what other Bluetooth enabled devices are within radio range, and to establish a "pairing" with the other unit. The second type is importance in that certain security keys and clock offsets are exchanged at that time, allowing the two units to communicate securely thereafter.

A number of Bluetooth related patent applications may be found in the art, some of which relate to the first type of situation, that is, to establishing a connection between two Bluetooth devices which have already established a "pairing" with each other.

Publication No. 2002/0115425 dated Aug. 22, 2002 to Olson et al for WIRELESS DEVICE AUTHENTICATION AT MUTUAL REDUCED TRANSMIT POWER teaches that Bluetooth enabled devices may be "authenticated" at a lower power setting. One advantage of such a low power authentication is that it reduces the chance that the security keys and clock offsets might be intercepted by a Bluetooth enabled device set to eavesdrop. More importantly, for devices such as headsets which have minimal user interfaces, the "power down" setting (reduced power, NOT power off) renders the device only able to communicate with other units at extremely close range, such as one meter. The proposed advantage, and also the disadvantage of such a system, is that Bluetooth registration will only occur with the given, close proximity unit.

Publication No. 2002/0111140 dated Aug. 15, 2002 to Kim for WIRELESS HEADSET CAPABLE OF AUTOMATIC LINK CONNECTION AND METHOD FOR CONTROLLING THE SAME teaches a headset having a folding microphone tube. When the microphone tube is unfolded, the device is turned on and Bluetooth registration occurs automatically, followed by an inquiry of the other type to determine if any connection is desired.

Publication No. 2002/0111138 dated Aug. 15, 2002 to Park for LINK CONNECTION METHOD BETWEEN COMMUNICATION TERMINALS EQUIPPED WITH BLUETOOTH WIRELESS DEVICES teaches automatic attempts to "re-link" Bluetooth devices (re-establish a connection) even when power is not turned on and off, such as after one device is taken out of range of the other device. Thus, this device does not deal with inquiry mode operations in which two or more Bluetooth units pair.

Publication No. 2002/0132582 dated Sep. 19, 2002 to Mooney for CELL PHONE EXTENSION USING WIRELESS PICONET teaches that two or more Bluetooth enabled cell phones might be linked by the Bluetooth protocol, one to act as a gatekeeper and the other one to act as a terminal.

Publication No. 2002/0115471 dated Aug. 22, 2002 to De Loye et al for METHOD FOR HANDLING CALLS RECEIVED AT A WIRELESS MOBILE TERMINAL COMPRISING A SHORT-RANGE INTERFACE CORRESPONDING WIRELESS MOBILE TERMINAL AND COMPUTER PROGRAM teaches use of devices having differing capabilities, such as using a headset to re-transmit print requests to a printer.

Publication No. 2002/0082057 dated Jun. 27, 2002 to Kim for SYSTEM AND METHOD FOR UTILIZING MOBILE COMMUNICATION TERMINAL AS WIRELESS HEADSET allows Bluetooth links to a PC, for use of a wireless headset with Internet Telephony.

Publication No. 2002/0045454 dated Apr. 18, 2002 to Iwata for RADIO COMMUNICATION CONNECTION DESTINATION SPECIFYING METHOD deals with infrared and radio links using the Bluetooth protocol.

Publication No. 2002/0021800 dated Feb. 21, 2002 to Bodley for HEADSET COMMUNICATION UNIT teaches a design for a hinge mechanism on a headset.

Publication No. 2002/0031645 dated Oct. 18, 2001 to Jarrett for MULTI-PURPOSE MOBILE CORDLESS PHONE SYSTEM teaches connection of fixed phones and cordless telephones or cellular telephones using protocols such as Bluetooth.

Finally, the only issued patent, U.S. Pat. No. 6,255,800 issued Jul. 3, 2001 to Bork for BLUETOOTH ENABLED MOBILE DEVICE CHARGING CRADLE AND SYSTEM teaches a charging cradle for cell phones and the like, the charging cradle is connected to a PC and may be Bluetooth enabled.

In general, Bluetooth enabled devices suffer from complexity of operation in terms of pairing the device to previously unknown Bluetooth devices. Many Bluetooth devices require that the user must access a sequence of menus on some type of LCD or CRT display, push buttons to indicate what is desired, and only then can pairing occur.

It would be advantageous to provide a method by which Bluetooth enabled devices could be easily paired with other Bluetooth enabled devices, yet with a minimal user interface that allowed smaller, lighter weight, less expensive and simpler devices.

SUMMARY OF THE INVENTION

General Summary

The present invention provides a Bluetooth enabled headset/master unit set which allows easy pairing of Bluetooth devices. The miniature headset of the present invention may be of a reduced size and weight due to the ease of pairing/authentication.

Pairing of the headsets and master units may be accomplished by a push button method: the master unit has a "pairing" button which when pushed, automatically causes the master unit to mate with nearby units, possibly at a lower power setting.

Pairing of the headsets and master units may be accomplished in an even simpler way, in which not even a button is necessary. In this embodiment of the invention, removal and replacement of the power supply of the unit (batteries in a wireless headset embodiment, batteries or a power switch in a master unit embodiment) is sufficient to cause the authentication/inquiry mode to begin operation, resulting in pairing with nearby Bluetooth enabled devices. In a sub-embodiment of this embodiment, the removal and replacement of the power supply must occur within a set time frame such as 45 seconds.

Device and method embodiments are taught.

Summary in Reference to Claims

It is therefore another aspect, advantage, embodiment and objective of the present invention to provide an improved Bluetooth enabled device for use as part of a wireless headset system, the device comprising: a power supply; a transceiver in electrical communication with the power supply; a link manager in electrical communication with the power supply, the link manager controlling the operations of the transceiver; wherein the link manager automatically enters an inquiry substate following an interruption of the power supply to the link manager.

It is therefore another aspect, advantage, embodiment and objective of the present invention to provide a device further comprising a wireless headset.

It is therefore another aspect, advantage, embodiment and objective of the present invention to provide a device further comprising a master unit.

It is therefore another aspect, advantage, embodiment and objective of the present invention to provide a device further comprising: a timer controlling entry of the link manager into the inquiry substate.

It is therefore another aspect, advantage, embodiment and objective of the present invention to provide a device wherein the timer only allows the link manager to enter the inquiry substate if the interruption in the power supply meets a first time criteria.

It is therefore another aspect, advantage, embodiment and objective of the present invention to provide a device wherein meeting the first time criteria further comprises one member selected from the group consisting of: subceeding a maximum time, exceeding a minimum time, equaling a time allotment, and combinations thereof.

It is therefore another aspect, advantage, embodiment and objective of the present invention to provide a method of pairing devices of a Bluetooth enabled wireless headset system, the method comprising the steps of: a) utilizing a prior connection state as needed; b) after a power interruption, determining if a time criteria is met; c) if the time criteria is met, automatically entering an inquiry substate; d) if the time criteria is not met, automatically returning to the prior connection state; and e) returning to step a).

It is therefore another aspect, advantage, embodiment and objective of the present invention to provide a method wherein meeting the first time criteria further comprises one member selected from the group consisting of: subceeding a maximum time, exceeding a minimum time, equaling a time allotment, and combinations thereof.

It is therefore another aspect, advantage, embodiment and objective of the present invention to provide a method wherein the power interruption is caused by the user pushing a button on the device.

It is therefore another aspect, advantage, embodiment and objective of the present invention to provide a method of pairing devices of a Bluetooth enabled wireless headset system, the method comprising the steps of: a) placing the units near to each other; Bluetooth) interrupting power to one of the units; c) automatically entering the inquiry substate following the interruption of the power supply.

It is therefore another aspect, advantage, embodiment and objective of the present invention to provide a method wherein the device further comprises a wireless headset.

It is therefore another aspect, advantage, embodiment and objective of the present invention to provide a method wherein the device further comprises a master unit.

It is therefore another aspect, advantage, embodiment and objective of the present invention to provide a method wherein the device further comprises: a timer controlling entry of the device into the inquiry substate.

It is therefore another aspect, advantage, embodiment and objective of the present invention to provide a method wherein the timer only allows the link manager to enter the inquiry substate if the interruption in the power supply meets a first time criteria, and further wherein the method comprises the following step after step b and before step c:

b2) if the interruption in the power supply meets a first time criteria, executing the following step c.

It is therefore another aspect, advantage, embodiment and objective of the present invention to provide a method wherein meeting the first time criteria further comprises one member selected from the group consisting of: subceeding a maximum time, exceeding a minimum time, equaling a time allotment, and combinations thereof.

DETAILED DESCRIPTION

Figure 1:
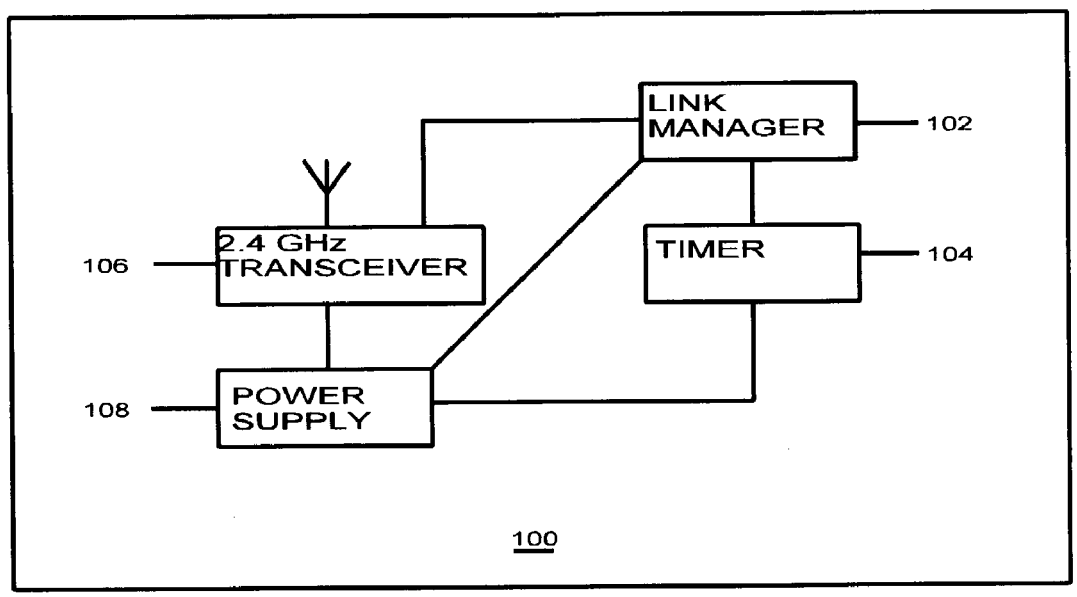
FIG. 1 is a block diagram of a device according to a first embodiment of the present invention.

FIG. 1 is a block diagram of a device according to a first embodiment of the present invention. An improved Bluetooth enabled device 100 for use as part of a wireless headset system has a power supply 108, a transceiver 106 in electrical communication with the power supply 108, a link manager 102 in electrical communication with the power supply 108, the link manager controlling the operations of the transceiver 106; and a timer 104 controlling the actions of transceiver 106. Device 100 may be a wireless headset itself, or device 100 may be a master unit. In general, both types of units may be used in a single wireless headset system. While there are substantial differences between the two types of devices, for purposes of the present invention, they may be treated very similarly. For example, the wireless headset normally has a microphone, a microphone tube, an earphone, a retainer to hold the device onto the head of the user and so on, however, these are not shown in FIG. 1. Similarly, the base unit/master unit may comprise a connection to a telephone or other device, but this is not shown in FIG. 1. In the headset embodiment of the invention, power supply 108 is most likely to be a set of batteries, rechargeable or non-rechargeable, whereas in the master unit may have be plugged into local current such as 110 VAC. In either type of power supply, the current works the same way.

Bluetooth transceiver 106 is normally an unlicensed transceiver having a short range, both attributes due to its operation in the 2.4 GHz bandwidth. The spread spectrum, frequency hopping signal will move among 79 different frequencies ranging from 2.400 to 2.4835 GHz in most nations, in other nations the frequency may be different without impact on the present invention. Time Division Multiplexing is used with a 625 microsecond slot length: this necessitates each Bluetooth device to maintain an internal clock and knowledge of the clock offsets of other devices, a fact relating to the present invention. Frequency modulation occurs in the Gaussian Frequency Shift Keying method with a BT of 0.5 and a modulation index ranging from 0.28 to 0.35.

Interference standards utilized allow up to seven simultaneous connections to be maintained. However, the number of headset/master unit combinations (and other types of Bluetooth devices) which may exist in one group of units (called a piconet) is not limited as some connections may be terminated and units placed into "park" mode. Thus, only units which are actively communicating with each other need have open channels. This fact will be alluded to later, in relation to the difference between establishing a connection and establishing a pairing.

Link manager 102 will operate transceiver 106 to provide communications for the actual headset/master unit functions, the "payload" of the Bluetooth device. Link manager 102 carries out several functions in order to do this.

The process of concern in the present invention is the "inquiry procedure". In the inquiry procedure, two Bluetooth units which have not previously communicated will establish the ability to communicate together. To understand why this is necessary, it is necessary to understand the nature of a Bluetooth piconet, an example of which is shown in FIG. 2.

Figure 2:
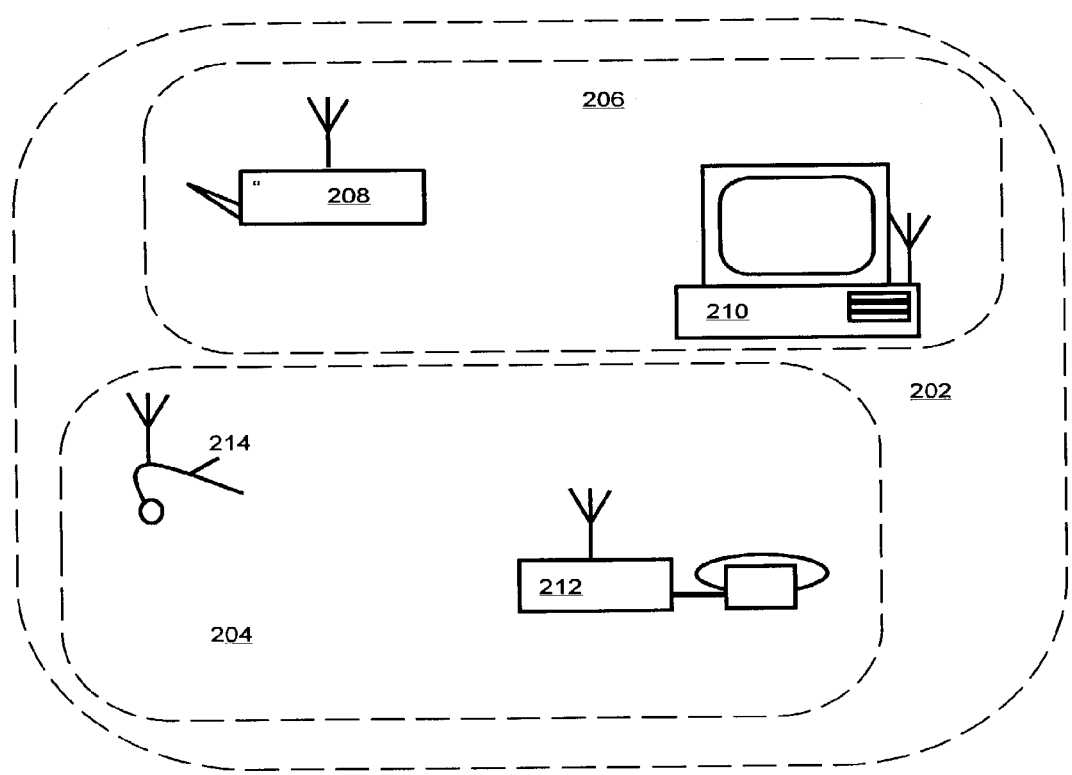
FIG. 2 is a schematic block diagram of three piconets having four Bluetooth enabled devices, showing the context of use of a second and third embodiment of the present invention.

FIG. 2 is a schematic block diagram of three piconets having four Bluetooth enabled devices, showing the context of use of a second and third embodiment of the present invention. Overall piconet 202 has two subnets, 204, 206. Subnet 204 has two component devices of a wireless headset system: wireless headset 214 and master unit 212. Wireless headset 214 may be worn by a user for voice communications with whatever device master unit 212 may be connected to. In FIG. 2 this is shown as a telephone, however, it may be a telephone, another audio device (such as a computer programmed to accept voice commands and input), or another device. Note that while headset 214 is schematically depicted to have a vertical antenna, the antenna is in all preferred embodiments internal to the headset device. The depiction is merely for clarity of understanding.

Piconet 206, on the other hand, has printer 208 and computer 210. These devices will be doing entirely different types of communication over the Bluetooth channels open between them. Overall piconet 202 may have all four devices in it, or more, not pictured. At any time, several devices may be communicating with other devices. Obviously, in such an arrangement, some type of addressing and encryption system becomes a necessity. Should headset unit 214 begin a packet broadcast, it is necessary that only master unit 212 receive the packets, not printer 208 or computer 210.

The security system utilized by the Bluetooth standard involves two units establishing communications links. First, the clock offsets discussed earlier must be sent and received, allowing the units to synchronize operations when communicating. Secondly, the two units must establish an initialization key using random numbers, device identifiers, and various addresses. This initialization key allows later establishment of one or more link keys, which provide secure communications. Carrying out this process, and methods of easing the process for users, are the topics of the present application. In general, this is called an "inquiry procedure". The inquiry procedure involves two substates which the Bluetooth devices may enter. In the "inquiry substate", a unit will attempt to discover what other units may be present. A unit which is allowing itself to be discovered will enter the "inquiry scan substate" in which it sends an "inquiry response". The present invention involves automatic initiation of these substates. Should a unit discover by this means a unit with which it has not previously communicated, it will automatically trade clock and key information so that in the future, connections between the two units may be established for useful communication.

After a number of units have been "paired", communications between members of the piconet becomes possible. Since the units will not all be communicating at the same time, it is necessary to distinguish active and inactive units, and sever connections between inactive units. This in turn means the units will have various states they may be in at any time, and procedures for calling each other into and out of such states. The two major states are self explanatory: CONNECTION and STANDBY. Three substates used to pair devices have been discussed: inquiry, inquiry scan, and inquiry response.

Four additional states are used in establishing a present connection between two units which have previously been paired. Page, page scan, master response and slave response may not concern the present invention although in general establishment of such an open channel involves link manager 102 sending a page to another known unit and receiving a page scan in response. This ability to terminate a connection and reestablish the same connection later should NOT be confused with the previously discussed inquiry procedures. In particular, prior art relating to establishing or re-establishing "a connection" does not relate to the present invention, which involves establishing or re-establishing "a pairing" between two devices.

Establishment of a pairing may be difficult in prior art: devices may require users to navigate complex menus shown on displays. This increases the size, complexity, un-reliability and weight of Bluetooth devices. In particular, headsets should have minimal user interfaces. In the present invention, this is handled by minimizing the user interface to a single button on a headset, or by entirely eliminating the user interface and requiring automatic initiation of an inquiry procedure at power up, or at power up under certain circumstances.

In one presently preferred embodiment and best mode presently contemplated for carrying out the invention, link manager 102 automatically enters an inquiry substate following an interruption of the electricity from power supply 108 to link manager 102. In another preferred embodiment of the present invention, timer 104 controlling entry of link manager 102 into the inquiry substate is used. In a subembodiment, timer 104 only allows link manager 102 to enter the inquiry substate if the interruption in the power supply meets a first time criteria. Meeting the first time criteria may further comprise one member selected from the group consisting of: subceeding a maximum time, exceeding a minimum time, equaling a time allotment, and combinations thereof. Thus, timer 104 may only cause link manager 102 to enter the inquiry substate if the time of interruption of electrical supply subceeds (is less than) a given time such as 2 minutes, or only if the time exceeds (is greater than) a given time such as 45 seconds, or is equal to a time allotment such as 20 seconds. Combinations of these may be used, such as 45 seconds or less. More complex combinations may also be used, such as less than 45 seconds or more than 5 minutes. Various types of convenience may be provided by this means. For example, in one embodiment, only time interruptions of 45 seconds or less will cause the entry into the desired substate. Interruptions greater than that time frame will not trigger inquiry procedures such as inquiry, inquiry scan or inquiry response, and thus the user will be spared the time taken during the inquiry procedures at start. By this means, the user may change the batteries on a battery powered device, or change electrical outlets on an AC device, without causing the inquiry procedures.

In other embodiments of the present invention, inquiry procedures may be initiated at the push of a button, thus drastically minimizing the user interface required on small devices such as the headset or the master unit. Most Bluetooth chip sets may be augmented with the addition of such circuitry or programming as in necessary to cause the immediate entry into inquiry substate without further ado.

Furthermore, in combined embodiments of the invention, the push of a button may even serve to interrupt the electrical supply for a predetermined length of time (time allotment), thus initiating the sequence outlined previously.

Figure 3:
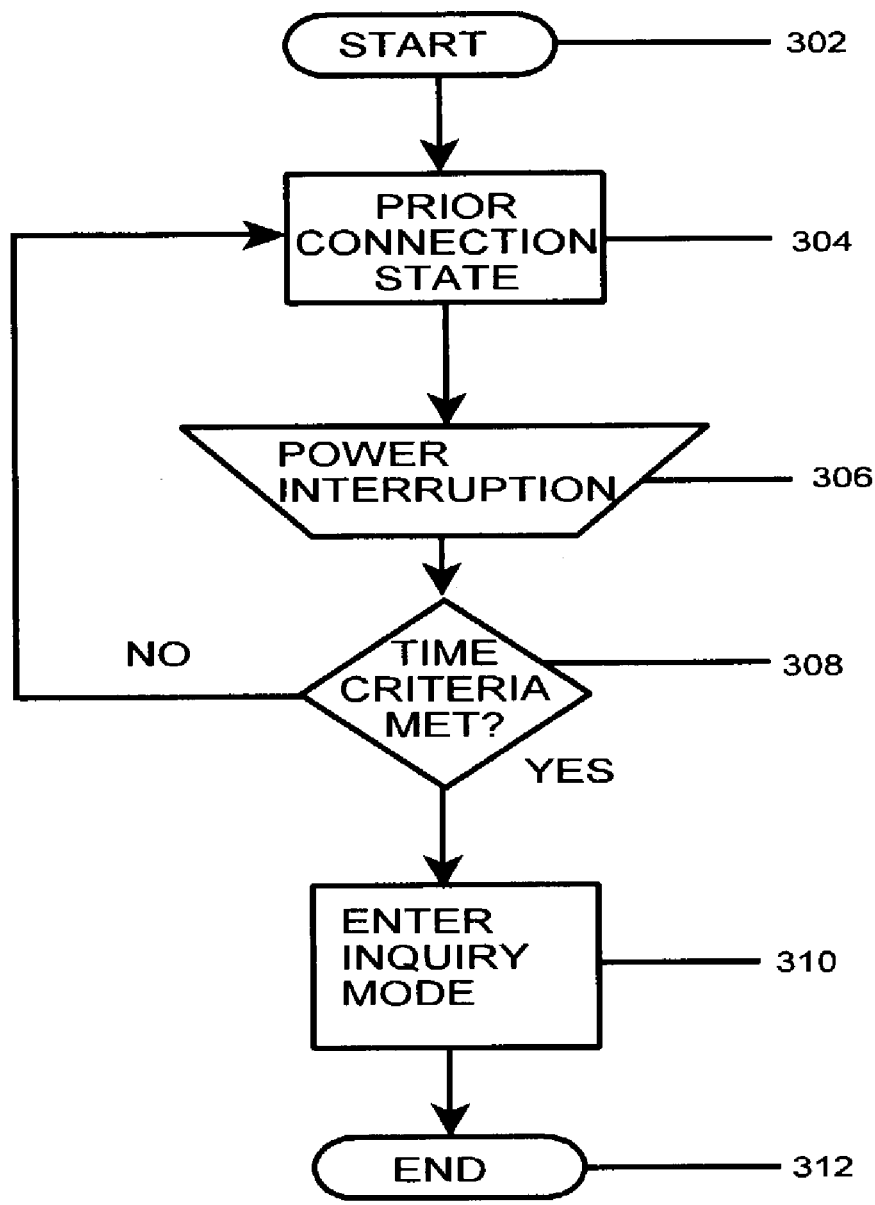
FIG. 3 is a flowchart of a fourth method embodiment of the present invention.
Figure 3A:
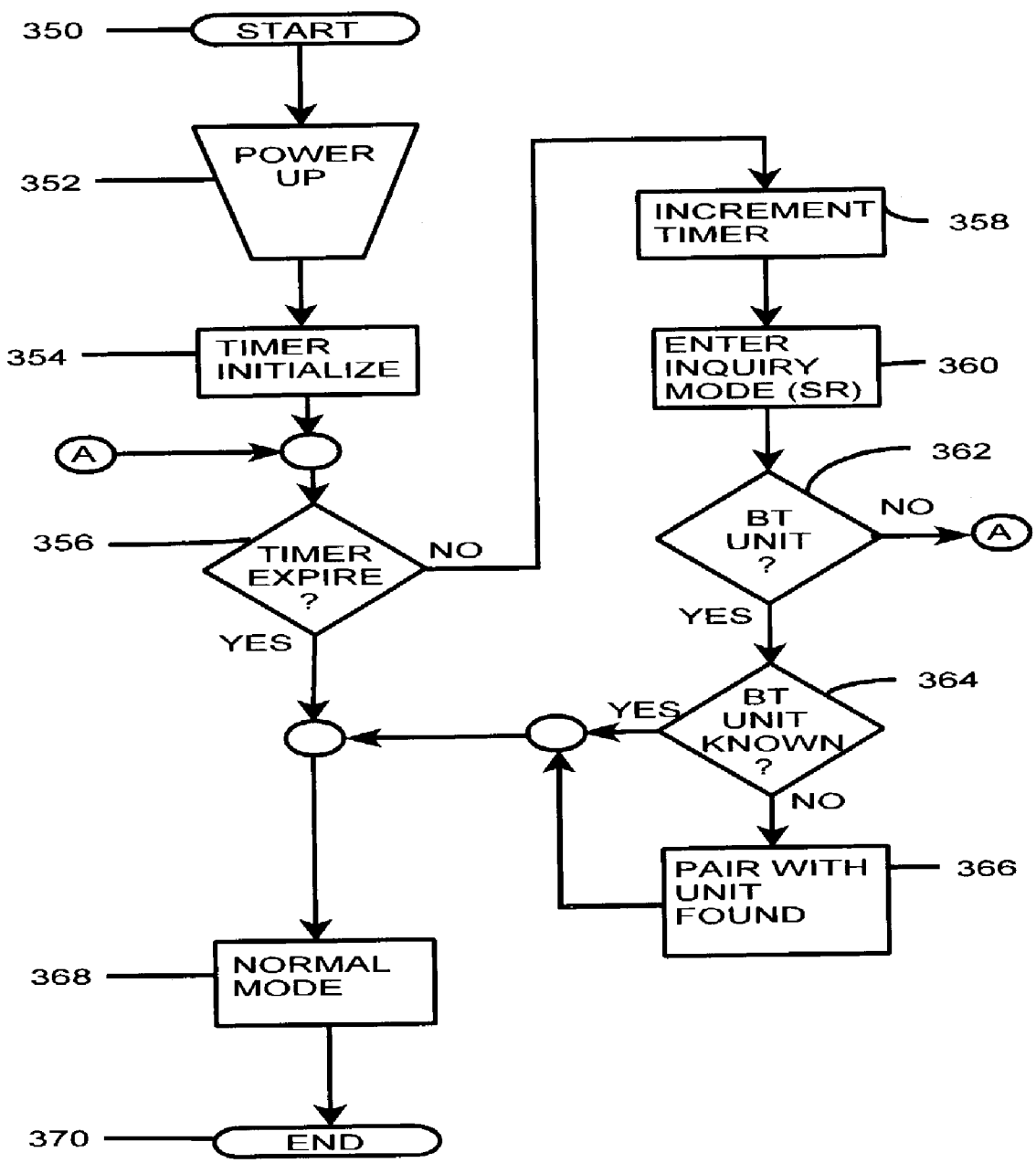
FIG. 3a is a flowchart of a fifth embodiment of the present invention.

FIG. 3 is a flowchart of a fourth method embodiment of the present invention. FIG. 3a is a flowchart of a fifth embodiment of the present invention, the two embodiments are related. The process outlined may occur inside of the Bluetooth unit.

The method of fifth embodiment (FIG. 3a) will be discussed before the method of the fourth embodiment. It may comprise the steps of:

a) Start operations. (350)

b) Manual power up of the device (352). This step may comprise pushing a button, plugging the device in, or advantageously, putting batteries into a device.

c) A timer may be initialized, for example, to execute the following operations a number of times "X", or for given number of clock cycles "Y" or other time criteria as needed. (354)

d) A time expire condition is checked, that is has the time criteria been met? This may constitute a count down to zero from a time, or a count up from zero to the time criteria set, etc. (356)

e) If time has not expired, carry out steps 358, 360, 362, and if necessary 364 and 366.

f) Increment, decrement or otherwise alter the timer. This may occur in terms of updating a data field or it may be an automatic operation of the chipset clock. (358)

g) Step 360 indicates the unit enters an inquiry mode. Note that the unit may automatically reduce power, thus entering a "short range mode" (indicated on FIG. 3a by the annotation (SR) at step 360). This short range mode is useful for preventing units from attempting to pair with too many other units in the larger area. The inquiry mode may be the Bluetooth inquiry mode, or it may constitute sending out a single inquiry, or inquiry page, or inquiry scan.

f) At step 364, if another Bluetooth unit is not detected, operation returns to step 356. If a Bluetooth unit is detected, step 366 must be carried out as well.

g) At step 366, the unit pairs with the newly found Bluetooth unit, by storing identity and/or code and/or timing information and by offering to the other unit the same information. As stated previously, this may involve use of such substates as the inquiry page and inquiry scan, etc. Thereafter, the unit may return to normal operations at step 368.

h) After timer expiration (356) or detection of another Bluetooth unit (364, 366) the unit enters normal mode.

These steps may be altered in yet further sub-embodiments of the invention. For example, after detection of a known Bluetooth unit at step 364, the device of the present invention may search again for a certain time for an unknown Bluetooth unit. Or multiple new units may be registered, by altering this control logic. Such sub-embodiments are within the abilities of one skilled in the art after reading this patent document and are included within the scope of the appended claims.

The method of the fourth embodiment (FIG. 3) of pairing devices of a Bluetooth enabled wireless headset system comprises the steps of:

a) utilizing a prior connection state as needed; (304)

b) after a power interruption, determining if a time criteria is met; (306, 308)

c) if the time criteria is met, automatically entering an inquiry substate; (310)

d) if the time criteria is not met, automatically returning to the prior connection state; and e) returning to step a).

This represents a simplified method. As discussed previously, additional steps and capabilities may be added without departing from the scope of the appended claims.

As noted previously, meeting the first time criteria may in embodiments further comprise one member selected from the group consisting of: subceeding a maximum time, exceeding a minimum time, equaling a time allotment, and combinations thereof.

More generally, another method embodiment of the present invention for pairing devices of a Bluetooth enabled wireless headset system comprises the steps of:
a) placing the units near to each other;
b) interrupting power to one of the units;
b2) if the interruption in the power supply meets a first time criteria, executing the following step c.
c) automatically entering the inquiry substate following the interruption of the power supply.

The units may automatically reduce transmission power at the time of pairing without departing the scope of the present invention.

The disclosure is provided to allow practice of the invention by those skilled in the art without undue experimentation, including the best mode presently contemplated and the presently preferred embodiment. Nothing in this disclosure is to be taken to limit the scope of the invention, which is susceptible to numerous alterations, equivalents and substitutions without departing from the scope and spirit of the invention. The scope of the invention is to be understood from the appended claims.

What is claimed is:

1. A wireless device for use as part of a wireless headset system, the device comprising:
a power supply;
a transceiver in electrical communication with the power supply;
a link manager in electrical communication with the power supply, the link manager controlling the operation of the transceiver; wherein the link manager automatically enters an inquiry substate following an interruption of the power supply to the link manager; and
a timer controlling entry of the link manager into the inquiry substate, wherein the timer only allows the link manager to enter the inquiry substate if the interruption in the power supply meets a first time criteria.

2. The device of claim 1, wherein said first time criteria comprises at least one member selected from the group consisting of less than a predetermined maximum time, more than a predetermined minimum time, and equaling a predetermined time.

3. A method of pairing at least first and second devices of a wireless headset system, comprising the steps of
a) placing said first and second devices within range of each other;
b) interrupting power to at least one of said first or second devices;
c) measuring the time during which power is interrupted; and
d) automatically entering the inquiry substate when the time during which said power is interrupted meets a predetermined time criteria.

4. The method of claim 3, wherein said predetermined time criteria is met when the time during which said power is interrupted is less than a predetermined maximum time.

5. The method of claim 3, wherein said predetermined time criteria is met when s the time during which said power is interrupted exceeds a predetermined minimum time.

6. The method of claim 3, wherein said predetermined time criteria is met when the time during which said power is interrupted equals a predetermined time.

* * * * *